United States Patent [19]

Grufstedt

[11] 3,959,504
[45] May 25, 1976

[54] PEELING ROOT VEGETABLES WITH NaOH AND HOT GAS TREATMENT

[75] Inventor: Sven-Gunnar Henrik Grufstedt, Kristianstad, Sweden

[73] Assignee: AB Svenska Foodco, Fjalkinge, Sweden

[22] Filed: Sept. 21, 1973

[21] Appl. No.: 399,544

[52] U.S. Cl. .............................. 426/287; 426/472; 426/482
[51] Int. Cl.² ............................................. A23I 1/10
[58] Field of Search ........... 426/287, 472, 465, 482, 426/456, 469, 483

[56] References Cited
UNITED STATES PATENTS

| | | | |
|---|---|---|---|
| 1,325,847 | 12/1919 | Horst | 426/482 |
| 3,115,176 | 12/1963 | Walker | 426/287 |
| 3,370,627 | 2/1968 | Willard | 426/482 |
| 3,517,715 | 6/1970 | Graham | 426/287 |
| 3,547,173 | 12/1970 | Graham | 426/287 |

Primary Examiner—Norman Yudkoff
Assistant Examiner—Martin G. Mullen
Attorney, Agent, or Firm—Karl W. Flocks

[57] ABSTRACT

A method of peeling root vegetables by dipping the vegetables into hot aqueous sodium hydroxide, and drying them at 100°–150°C for 2–5 minutes by intense application of a drying gas, such as hot air or superheated steam, whereupon the root vegetables are allowed to rest for 3–10 minutes at ambient temperature.

5 Claims, No Drawings

PEELING ROOT VEGETABLES WITH NaOH AND HOT GAS TREATMENT

The present invention relates to a method of peeling root vegetables, especially potatoes, and more precisely to a so-called lye peeling method.

Industrial peeling of root vegetables, especially potatoes, is now being conducted on a large scale in accordance with one of three different methods, i.e. mechanical peeling by abrading, steam peeling and lye peeling. Lye peeling with which the present invention is concerned, is usually conducted in such a manner that unpeeled potatoes are treated with 12-25% NaOH solution having a temperature of about 60°-90°C until the peel has softened and loosened. The peel is then removed by tumbling the potatoes and subjecting them to strong jets of water. This peeling method usually brings excellent results, but peeling losses and the consumption of lye and water are high. Furthermore, the waste is obtained in the form of a diluted aqueous solution and suspension of organic matter causing heavy pollution of the water streams into which it is usually discharged after filtration by mechanical means in a greater or less degree. Furthermore, the pH of the waste water is relatively high, between 11 and 12. In view hereof, it has long been endeavoured to provide an anti-pollutional lye-peeling method having a low consumption of lye and water and giving a minimum of peel waste in as dry a form as possible. Several new lye-peeling methods according to these principles have been developed and are described in U.S. Pat. Nos. 3,370,627, 3,517,715 and 3,547,173.

According to U.S. Pat. No. 3,517,715, potatoes are treated with hot lye for a short period of time by dipping the potatoes into a 15-30% NaOH lye at a temperature of 65°-100°C, for example for 45 seconds in 20% lye having a temperature of 77°C. After the lye treatment, the potatoes are subjected to heat treatment by infrared radiation. As in all other heat treatment of potatoes, it is important to avoid so-called heat rings, i.e. the formation of a layer of gelatinized starch in the potatoe. Such layers are developed when the potatoes are heated to temperatures above about 62°C and appear in a halved potato in the form of a glassy ring. For this reason, inter alia, the time of the infrared heating is kept short, for instance 1.5 minutes. After the infrared heating, the potatoes are peeled. In contradistinction to conventional lye-peeling, peeling is conducted in the U.S. patent specification substantially without the supply of water, i.e. as a dry peeling operation utilising rotating rolls equipped with rubber fingers.

Infrared heating is described also in U.S. Pat. No. 3,370,627 which, however, does not concern the peeling but the after-treatment of potatoes which have first been lye-peeled in conventional manner. By this after-treatment various kinds of defects are removed and manual trimming is reduced.

According to U.S. Pat. No. 3,547,173, the potatoes are subjected after the lye treatment according to the above-mentioned U.S. Pat. No. 3,517,715 to a temperature of about 75°-100°C for 2-10 minutes, whereupon peeling is carried out. The peeling here comprises two steps, the first step being a peeling with finger-equipped rolls, as described above, and the second step comprising the removal of the last peel rests with the aid of brush rollers under application of a small amount of water.

The above-mentioned peeling methods by infrared heating suffer from various disadvantages. Thus, infrared heating is quick and intense, and the treatment time must therefore be short and carefully controlled so that heat rings and charred peels are avoided. Furthermore, as infrared heating is carried out by means of radiation, visual contact must be maintained between the heat source and the article to be heated. This means that the potatoes must be rotated and tumbled continuously if heating is to be uniform, and furthermore only a single layer of potatoes can be subjected to infrared heating since otherwise the uppermost potato layer will block out the underlying potato layers and prevent their reception of radiation heat. A further disadvantage is that the potatoes during the required rotation and tumbling are contacted with one another or the base and thus suffer surface damage so that the peel will be removed in places. Since the lye previously applied usually occurs in connection with the peel, the lye will be removed in such places, and during the heat treatment the potatoes will thus exhibit a surface of non-uniform lye concentration. This increases the risk of heat ring formation and gives unsatisfactory peeling results.

It has now been discovered that drying the root vegetables after the lye treatment is important in order to obtain a satisfactory result, and to be effective this drying must take place at a temperature above 100°C, preferably at 100°-150°C. The drying will cause part of the water in the lye layer applied to the surface of the root vegetables to evaporate, thereby increasing the lye concentration so that the lye will have a better effect. In this manner, it is possible to obtain satisfactory peeling results with a very small amount of lye. The lye concentration can be increased in spite of the fact that the lye is neutralised and diluted by the fruit water underneath the peel of the root vegetables. To obtain these effects, drying must, however, be positive, i.e. it shall efficiently remove the water evaporated from the surface of the root vegetables. This is accomplished in the present invention by subjecting the root vegetables to a strong jet of drying gas. For maximum effect, drying is so conducted that the lye concentration during drying is held at approximately 20-30%. However, drying must not be so intense that the lye concentration is increased to 100% since this will detract from the efficiency of the lye.

In the method according to the present invention, unpeeled root vegetables are first treated for a short period of time (0.5-1 minute) with hot aqueous sodium hydroxide, followed by heat treatment and peeling. The invention is characterised in that the root vegetables during the heat treatment are first dried at a temperature of 100°-150°C for 2-5 minutes by means of an intense application of a drying, hot gas stream, and that the root vegetables during a period of rest are then maintained at ambient temperature for 3-10 minutes.

Drying preferably occurs at a temperature of 110°-120°C for 3-4 minutes.

The period of rest preferably is 5-6 minutes.

Hot air or superheated steam is preferably used as the drying gas.

The drying gas stream is applied at a rate of preferably 1-5 meters/second.

In the present invention, the initial lye treatment and the final peeling are conducted substantially in accordance with the methods previously mentioned in connection with the U.S. patent specifications.

As has been pointed out above, the characteristic features of the present invention thus lie in the heat treatment step and the drying resulting therefrom.

The method of the present invention overcomes the previously mentioned disadvantages of infrared peeling, while simultaneously providing an excellent peeling with a minimum consumption of lye and water and a small amount of peel waste. The method of the present invention therefore is both economic and anti-pollutional. Thus, the lye consumption during peeling of potatoes amounts to but about 0.5–1.5 kilograms of NaOH per metric ton of potatoes, while the water consumption amounts to about 2 metric tons per metric ton of potatoes. Besides, the peel waste is but 10–12%, and this means that of the fruit flesh of the potatoes much less goes to waste than in conventional lye peeling. Furthermore, in contradistinction to conventional lye peeling, the peel waste is not obtained in the form of a diluted aqueous solution which is difficult to handle and polluting, but in the form of a very thick paste than can be burnt while generating thermal energy, or possibly be used as animal feed. Because of the small supply of lye and the, because of the drying method, efficient utilisation of the lye, the peel waste contains an extremely small quantity of lye.

The method of the invention furthermore offers advantages as compared to infrared peeling, in that one is not reduced to the heat treatment of a single layer of root vegetables, but can dry and subject to heat treatment root vegetables in layers having a thickness of 2 decimeters or more. In this manner, a considerable increase in capacity per square meter of belt surface is obtained in the drying and heat treatment apparatus. Furthermore, no continuous tumbling of the root vegetables during heat treatment is necessary, and one or two tumblings are enough for the entire heat treatment. In this manner, the above mentioned surface damage will be almost entirely eliminated.

To further illustrate the invention, the following Example is given of a procedure, preferred at present, for the peeling of potatoes.

EXAMPLE

Unpeeled Bintje potatoes were introduced into a lathwork drum that was immersed in a container holding 16% NaOH. The lye temperature was 80°C. After immersion for 45 seconds, the drum with the potatoes was removed. The drum with the lye-treated potatoes was then transferred to an air-conditioning cabinet in which it was subjected for 3 minutes to application of hot air having a temperature of 110°C. The air velocity was 2.5 meters/second. After drying, the drum with the potatoes was removed and introduced into a sealed chamber without circulation of air where it was kept for a period of rest of 5 minutes. After this rest, the drum with the potatoes was removed from the chamber, and the potatoes were examined for peelability. It was found that the potatoes had a substantially dry surface, and that the peels loosened extremely easily and completely from the tubers. Furthermore, it was found that only the peel and practically nothing of the fruit flesh was removed during peeling, and that the peel waste had a highly paste-like consistency, without being tacky. Scab and other surface defects of the potatoes were readily removed with the peel, and additional manual trimming was required for deeper defects only.

The reason herefor is that porous parts of the peel absorb more lye than smooth surfaces during lye dipping. The drying-concentration method then brings about a stronger lye penetration in such places than on the smooth peel. When the potatoes were halved, there was no sign of heat ring formation.

The Example clearly shows that the present invention provides an economical method of peeling potatoes with excellent results. Furthermore, because of the small amounts of lye and water employed and the advantageous form in which the peel waste is obtained, the method of the present invention causes a minimum of environmental pollution.

Although the invention has here been described with reference to the peeling of potatoes, it is, of course, not restricted thereto, but may be used also for peeling other root vegetables, fruit and vegetables, such as carrots, cucumbers, tomatoes, apples, pears etc.

What I claim and desire to secure by Letters Patent is:

1. In a method of peeling root vegetables by treating unpeeled root vegetables during 0.5 to 1 minute with 12–25% aqueous sodium hydroxide at a temperature of about 60°–90°C, followed by heat treatment and then peeling, the improvement wherein said heat treatment comprises (1) drying said root vegetables by means of a drying, hot gas stream of hot air or superheated steam applied at a rate of 1–5 meters per second for 2–5 minutes at a temperature of 100°–150°C to increase and hold the sodium hydroxide concentration on the root vegetable skin at approximately 20–30%, and (2) then withdrawing application of the hot gas stream and maintaining said root vegetables without supplying or removing heat for 3–10 minutes.

2. A method as claimed in claim 1, wherein said drying is carried out at a temperature of 110°–120°C for 3–4 minutes.

3. A method as claimed in claim 1, wherein the period of said maintaining of the root vegetables without supplying or removing heat is 5–6 minutes.

4. A method as claimed in claim 1, wherein hot air is used as the drying gas.

5. A method as claimed in claim 1, wherein superheated steam is used as the drying gas.

* * * * *